United States Patent
Enault et al.

(10) Patent No.: US 9,244,939 B2
(45) Date of Patent: Jan. 26, 2016

(54) MANAGING I/O OPERATIONS IN A SHARED FILE SYSTEM

(71) Applicant: LENOVO ENTERPRISE SOLUTIONS (SINGAPORE) PTE. LTD., New Tech Park (SG)

(72) Inventors: Ludovic Enault, Montpellier (FR); Eric Michel, Saint-Aunes (FR); Nicolas Tallet, Montpellier (FR); Pascal Vezolle, Villeneuve les Maguelone (FR)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 287 days.

(21) Appl. No.: 13/928,547

(22) Filed: Jun. 27, 2013

(65) Prior Publication Data

US 2015/0006593 A1  Jan. 1, 2015

(51) Int. Cl.
  *G06F 17/30* (2006.01)
  *G06F 11/14* (2006.01)
  *H04L 29/06* (2006.01)

(52) U.S. Cl.
  CPC ...... *G06F 17/30194* (2013.01); *G06F 11/1464* (2013.01); *G06F 17/30224* (2013.01); *H04L 63/102* (2013.01)

(58) Field of Classification Search
  CPC .............. G06F 17/30194; G06F 17/30224; G06F 11/1464; H04L 63/102
  USPC ......................................................... 707/827
  See application file for complete search history.

(56) References Cited

U.S. PATENT DOCUMENTS

| | | | | |
|---|---|---|---|---|
| 5,692,204 | A * | 11/1997 | Rawson et al. | 713/340 |
| 6,697,846 | B1 * | 2/2004 | Soltis | G06F 17/30194 707/999.001 |
| 6,779,181 | B1 * | 8/2004 | Yu | G06F 9/4881 718/102 |
| 7,000,072 | B1 * | 2/2006 | Aisaka | G06F 12/084 707/999.202 |
| 7,076,783 | B1 * | 7/2006 | Frank | H04L 41/0893 709/220 |
| 7,181,768 | B1 * | 2/2007 | Ghosh | G06F 21/552 706/25 |
| 7,228,352 | B1 * | 6/2007 | Yaguchi et al. | 709/229 |
| 7,490,072 | B1 * | 2/2009 | Cowan et al. | 706/47 |

(Continued)

FOREIGN PATENT DOCUMENTS

WO  WO 2012048622 A1 * 4/2012 ............ G06F 9/4881

OTHER PUBLICATIONS

Swinehart et al., "WFS: A Simple Shared File System for a Distributed Environment", In SOSP '79 Proceedings of the Seventh ACM Symposium on Operating Systems Principles, ACM, New York, USA, 1979, pp. 9-17.*

(Continued)

*Primary Examiner* — Phuong Thao Cao
(74) *Attorney, Agent, or Firm* — Katherine Brown

(57) ABSTRACT

A method for managing I/O operations in a shared file system environment. The method includes receiving for each of a plurality of compute nodes, information associated with I/O accesses to a shared file system, and applications for executing the I/O accesses. The method includes creating application profiles, based, at least in part, on the received information. The method then includes determining execution priorities for the application, based, at least in part, on the created application profiles.

12 Claims, 3 Drawing Sheets

(56) References Cited

U.S. PATENT DOCUMENTS

| | | | |
|---|---|---|---|
| 7,617,216 B2* | 11/2009 | Fridella | G06F 17/30194 |
| 7,673,169 B1* | 3/2010 | Kumaresan et al. | 714/4.4 |
| 7,890,555 B2 | 2/2011 | Gunda et al. | |
| 8,112,505 B1* | 2/2012 | Ben-Shaul | G06F 17/30168 |
| | | | 709/217 |
| 8,171,106 B2 | 5/2012 | Chaudhary et al. | |
| 8,275,815 B2* | 9/2012 | Aronovich | G06F 17/30115 |
| | | | 707/826 |
| 8,555,282 B1* | 10/2013 | Kahn et al. | 718/102 |
| 8,712,960 B2* | 4/2014 | Frost | G06F 17/30194 |
| | | | 707/634 |
| 8,832,780 B1* | 9/2014 | Sarin | G06F 21/6245 |
| | | | 726/1 |
| 8,918,566 B2* | 12/2014 | Padala | G06F 3/061 |
| | | | 710/36 |
| 8,918,787 B2* | 12/2014 | Ostojic | G06F 9/4818 |
| | | | 718/103 |
| 2003/0115205 A1* | 6/2003 | French et al. | 707/100 |
| 2004/0153728 A1* | 8/2004 | Suzuki | G06F 11/00 |
| | | | 714/6.12 |
| 2005/0155033 A1* | 7/2005 | Luoffo et al. | 718/104 |
| 2005/0180385 A1* | 8/2005 | Jeong et al. | 370/350 |
| 2005/0192969 A1* | 9/2005 | Haga | G06Q 10/02 |
| 2006/0271596 A1* | 11/2006 | Sabsevitz | G06F 17/30067 |
| 2007/0067435 A1* | 3/2007 | Landis | G06F 9/5016 |
| | | | 709/224 |
| 2007/0150599 A1* | 6/2007 | Neogi | G06F 9/5061 |
| | | | 709/227 |
| 2008/0047010 A1* | 2/2008 | Marceau | 726/23 |
| 2008/0201450 A1* | 8/2008 | Bong | G06F 9/468 |
| | | | 709/219 |
| 2009/0172821 A1* | 7/2009 | Daira | G06F 21/55 |
| | | | 726/27 |
| 2010/0005173 A1* | 1/2010 | Baskaran | G06F 15/16 |
| | | | 709/226 |
| 2010/0122256 A1* | 5/2010 | Darrington et al. | 718/102 |
| 2010/0205137 A1* | 8/2010 | Barsness et al. | 706/52 |
| 2010/0205619 A1* | 8/2010 | Barsness et al. | 719/331 |
| 2010/0250634 A1* | 9/2010 | Torii | G06F 21/604 |
| | | | 707/827 |
| 2010/0257533 A1* | 10/2010 | Dvir et al. | 718/103 |
| 2010/0262977 A1* | 10/2010 | Havemose | G06F 9/545 |
| | | | 719/310 |
| 2010/0306850 A1* | 12/2010 | Barile et al. | 726/25 |
| 2011/0252166 A1* | 10/2011 | Padala | G06F 3/061 |
| | | | 710/74 |
| 2011/0265089 A1* | 10/2011 | Ostojic | G06F 9/4818 |
| | | | 718/103 |
| 2011/0296422 A1 | 12/2011 | Hildebrand et al. | |
| 2012/0023233 A1* | 1/2012 | Okamoto | G06F 9/4856 |
| | | | 709/226 |
| 2012/0042394 A1* | 2/2012 | Jakobson | G06F 21/554 |
| | | | 726/29 |
| 2012/0047509 A1* | 2/2012 | Ben-Itzhak | G06F 9/50 |
| | | | 718/103 |
| 2012/0066191 A1* | 3/2012 | Chang | G06F 17/30171 |
| | | | 707/704 |
| 2012/0124196 A1* | 5/2012 | Brisebois | H04W 76/068 |
| | | | 709/224 |
| 2012/0166499 A1 | 6/2012 | Anderson et al. | |
| 2012/0210325 A1* | 8/2012 | de Lind van Wijngaarden | H04W 52/0258 |
| | | | 718/103 |
| 2012/0331235 A1* | 12/2012 | Katori | G06F 12/0862 |
| | | | 711/137 |
| 2013/0275973 A1* | 10/2013 | Greenfield | G06F 9/44584 |
| | | | 718/1 |
| 2014/0006616 A1* | 1/2014 | Aad et al. | 709/225 |
| 2014/0089994 A1* | 3/2014 | Fujisawa | H04N 21/443 |
| | | | 725/86 |
| 2014/0108649 A1* | 4/2014 | Barton | G06F 9/45533 |
| | | | 709/224 |
| 2015/0006593 A1* | 1/2015 | Enault | G06F 17/30194 |
| | | | 707/827 |

OTHER PUBLICATIONS

Cloud, R. "Problems in Modern High Performance Parallel I/O Systems". Sep. 6, 2011. arXiv:1109.0742v1 [cs.DC] Sep. 4, 2011, 21 pages.

Feitelson, D. et al. "Parallel I/O Subsystems in Massively Parallel Supercomputers". <http://www.cs.huji.ac.il/~feit/papers/ParlOSyst95PDT.pdf>, IEEE Parallel & Distributed Technology 3(3), 28 pages, 1995.

Nisar, A. et al. "Delegation-Based I/O Mechanism for High Performance Computing Systems". IEEE Transactions on Parallel and Distributed Systems, vol. 23, No. 2 Feb. 2012. Published by the IEEE Computer Society, pp. 271-279.

Ou, L. "Deploying 10GigE Network for High Performance Clusters". NFS Server with 10 Gigabit Ethernet Networks, A Dell Technical White Paper. <delltechcenter.com>, 17 pages.

* cited by examiner

MANAGING I/O OPERATIONS IN A SHARED FILE SYSTEM

FIELD OF THE INVENTION

The present invention relates generally to the field of data processing means for file management, and more particularly to managing I/O operations in a shared file system.

BACKGROUND OF THE INVENTION

Cluster computing is one of the most popular platforms for high-performance computing today. Cluster architecture is useful for large computing systems because by grouping servers and other resources together in a cluster, organizations can increase performance, balance traffic and create high availability. Important, however, is that the cluster appears as a single highly available system to end users, and for both economical and technical reasons, most cluster computing systems use a shared file system. A shared file system allows access to data and files by multiple servers via a high speed network. Each server can then perform I/O operations at the speed of the network, however, when I/O requirements and activities from the cluster exceed the I/O capability, there are significant degradations in the I/O performance. Additionally, like traditional parallel computing systems, the I/O subsystems of clusters may form a bottleneck that affects overall system performance.

SUMMARY

Embodiments of the present invention disclose a method, computer program product, and computer system for managing I/O operations in a shared file system environment. The method includes receiving, by one or more computer processors, for each of a plurality of compute nodes, information associated with I/O accesses to a shared file system, and applications for executing the I/O accesses. The method includes creating, by the one or more computer processors, application profiles, based, at least in part, on the received information. The method then includes determining, by the one or more computer processors, execution priorities for the application, based, at least in part, on the created application profiles.

DETAILED DESCRIPTION

Figure 1:
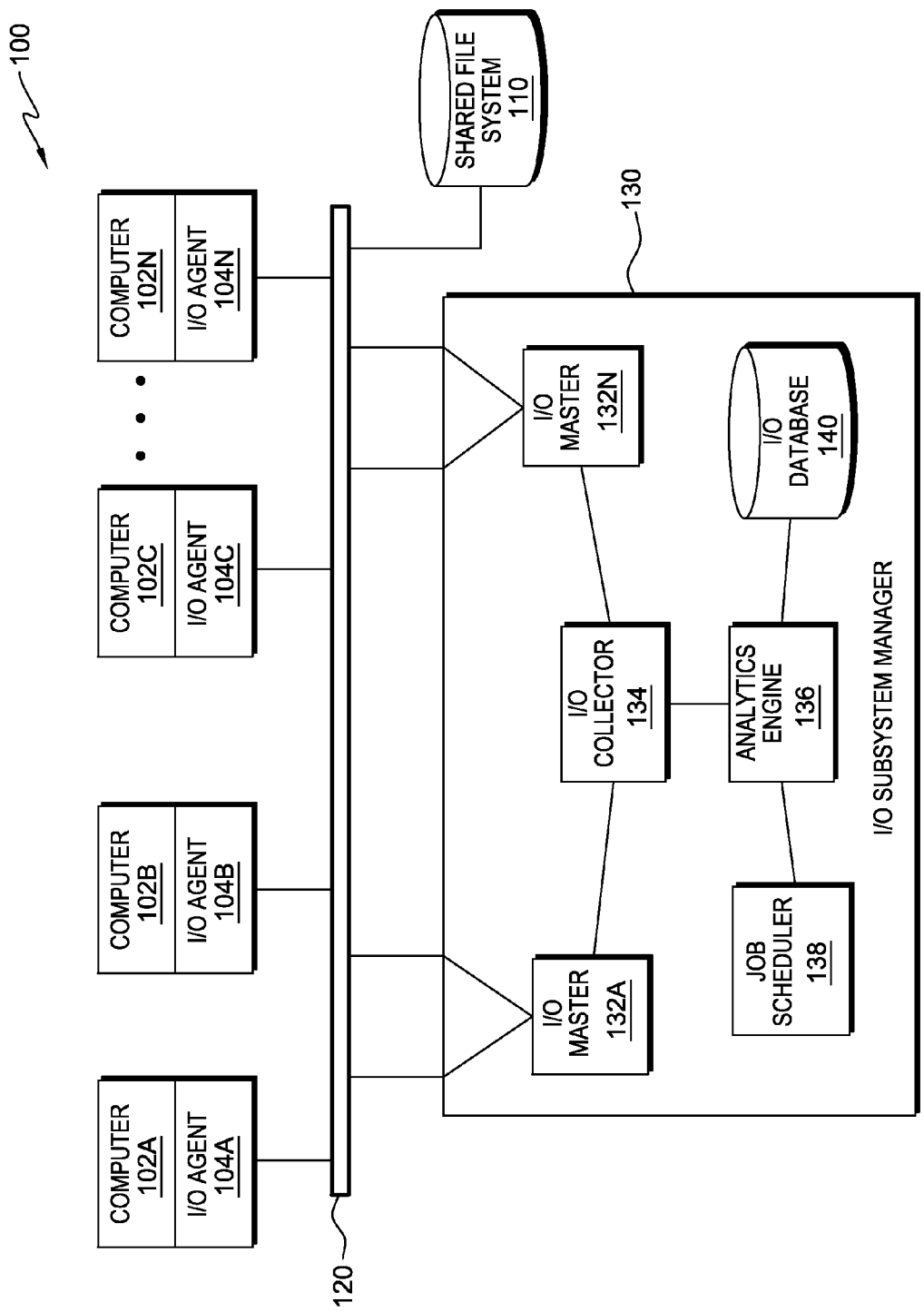
FIG. 1 is a functional block diagram illustrating a shared file system environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a shared file system environment, generally designated 100, in accordance with an embodiment of the present invention.

Shared file system environment 100 includes a shared file system 110, computers 102A to 102N, and I/O subsystem manager 130, all interconnected over network 120. Network 120 can be, for example, a local area network (LAN), a wide area network (WAN) such as the Internet, a storage area network (SAN), or a combination of the three, and can include wired, wireless, or fiber optic connections. In general, network 120 can be any combination of connections and protocols that will support communications between shared file system 110, computers 102A to 102N, and I/O subsystem manager 130.

Shared file system 110 is a file system which is shared to provide access from multiple computers, for example, computers 102A to 102N, over a network, for example, network 120. Shared file system 110 can represent a shared file system, a clustered file system, a parallel file system, a distributed file system, a network file system, or any other file system which can provide a manner of storing and accessing data, including using redundancy and location independent addressing, to improve reliability and performance.

In various embodiments of the present invention, computers 102A to 102N can each be a laptop computer, a notebook computer, a personal computer (PC), a desktop computer, a tablet computer, a handheld computing device or smartphone, a thin client, a mainframe computer, a networked server computer, or any programmable electronic device capable of running applications in serial or parallel, accessing network 120 and communicating with I/O subsystem manager 130. Each of computers 102A to 102N represents a compute node, which can be any device connected to the network and running its own instance of an operating system. In an exemplary embodiment, each of computers 102A to 102N can run applications in either serial or parallel, and each computer, or the set of computers, may represent a computing system utilizing clustered computers and components to act as a single pool of resources when accessed through a network.

In shared file system environment 100, each of computers 102A to 102N includes I/O agents 104A to 104N, respectively, and each I/O agent is couple to one of I/O masters 132A to 132N. I/O agents 104A to 104N are in charge of monitoring and controlling I/O operations in real time at the kernel level, per compute node and per application on each of computers 102A to 102N. In an exemplary embodiment of the present invention, monitoring I/O operations per compute node and per application can include recording, or creating records, of the I/O activity and operations and storing the records in a database. A defined set of I/O agents 104 is managed by an I/O master 132. In exemplary embodiments of the present invention, the number of I/O agents 104 depends on the size of shared file system 110, and can be adapted based on the size and performance requirements of the shared file system, types of applications running on each of the computers 102 (also the compute nodes 102), and compute node architecture, including number of cores, memory size, and number of network links. I/O agents 104 have access to monitoring data and operating system parameters, for example, in order to monitor and control, for example, block, delay or slow down, I/O activity and I/O operations on each compute node for each application in real time, report records to their respective I/O masters 132, and receive operations from their respective I/O masters. In various embodiments of the present invention, I/O agents 104 can also control dynamic parameters of each compute node 102, such as clock frequency. I/O requirements, operations, and real time activities are communicated to I/O subsystem manager 130 via I/O agents 104A to 104N on each compute node, computers 102A to 102N in shared file system environment 100.

I/O subsystem manager 130 balances and optimizes I/O accesses and performances by setting application execution priorities and resource allocations within shared file system environment 100, minimizes I/O overhead, and manages application scheduling based on the I/O requirements, operations and real time activities received via I/O agents 104. I/O subsystem manager 130 includes I/O masters 132A to 132N, I/O collector 134, analytics engine 136, job scheduler 138 and I/O database 140. I/O subsystem manager 130 can be an integrated program executing on a computer system, or each function or module within the I/O subsystem manager may run on any combination of separate computer systems within shared file system environment 100. Internal and external components of a computer system on which I/O subsystem manager 130 may operate in an exemplary embodiment of the present invention are depicted and described in further detail with respect to FIG. 3.

Each I/O master 132 manages a set of I/O agents 104A to 104N. The number of I/O masters 132 depends on the number of I/O agents 104. In an exemplary embodiment of the present invention, the number of I/O masters 132 can be adjusted to improve the ability of I/O subsystem manager 130 to adapt to increased I/O operations and activities. I/O masters 132A to 132N receive I/O records from their respective I/O agents 104, and send operations to the I/O agents. Each I/O master 132 shares information with other I/O masters to control I/O operations within shared file system environment 100, per compute node and per application, in order to balance and optimize I/O performance based on I/O capabilities of the shared file system environment. Each I/O master sends I/O application records to the I/O collector, for example, I/O collector 134 on I/O subsystem manager 130, and receives application and I/O policies and priorities from the I/O collector.

I/O collector 134 is connected to each I/O master and acts to centralize information. I/O collector 134 collects application profile information, for example, application names, test case data, number of compute nodes, types of compute nodes, I/O requirements, I/O frequency, I/O communication, I/O computation ratios, I/O patterns, types of execution and execution profiles. I/O collector 134 sends the collected information to analytics engine 136. In various embodiments of the present invention, a secondary, or backup, I/O collector may be present.

In an exemplary embodiment of the present invention, job scheduler 138 is a computer application for controlling and monitoring program execution in a network of computers, such as is present in shared file system environment 100. Job scheduler 138 sets application execution priorities and receives resource allocations and job scheduling orders from analytics engine 136. Application execution priorities control I/O accesses to shared file system 110 from each compute node 102. Job scheduler 138 may take into account a variety of policies and parameters, for example, users or application types, in determining whether to submit an application to shared file system environment 100.

Analytics engine 136 receives the collected, centralized application profile information from I/O collector 134, creates application profiles for analysis and decision, and stores the application profiles in a database, such as I/O database 140. Analytics engine 136 analyzes the data in the stored application profiles in order to manage the application workload and resources within shared file system environment 100. Analytics engine 136 determines actions to be taken by job scheduler 138 and at the compute node level by I/O agents 104A to 104N and sends orders to either the job scheduler to manage application queues and jobs currently running on compute nodes 102, or to I/O agents on each compute node 102 (via I/O collector 134 and I/O masters 132) to perform actions at the compute node level. Analytics engine 136 can also receive application priority information from job scheduler 138. While in FIG. 1, analytics engine 136 is shown separate from job scheduler 138, one of skill in the art will appreciate that analytics engine 136 may operate within job scheduler 138.

I/O database 140 stores the application profiles created by analytics engine 136. Stored application profiles are analyzed by analytics engine 136 and can describe I/O requirements, I/O patterns, types of execution, and execution profiles. Such execution profiles include parameters such as number and type of compute nodes, I/O frequency, I/O communication, and I/O computation ratios.

Figure 2:
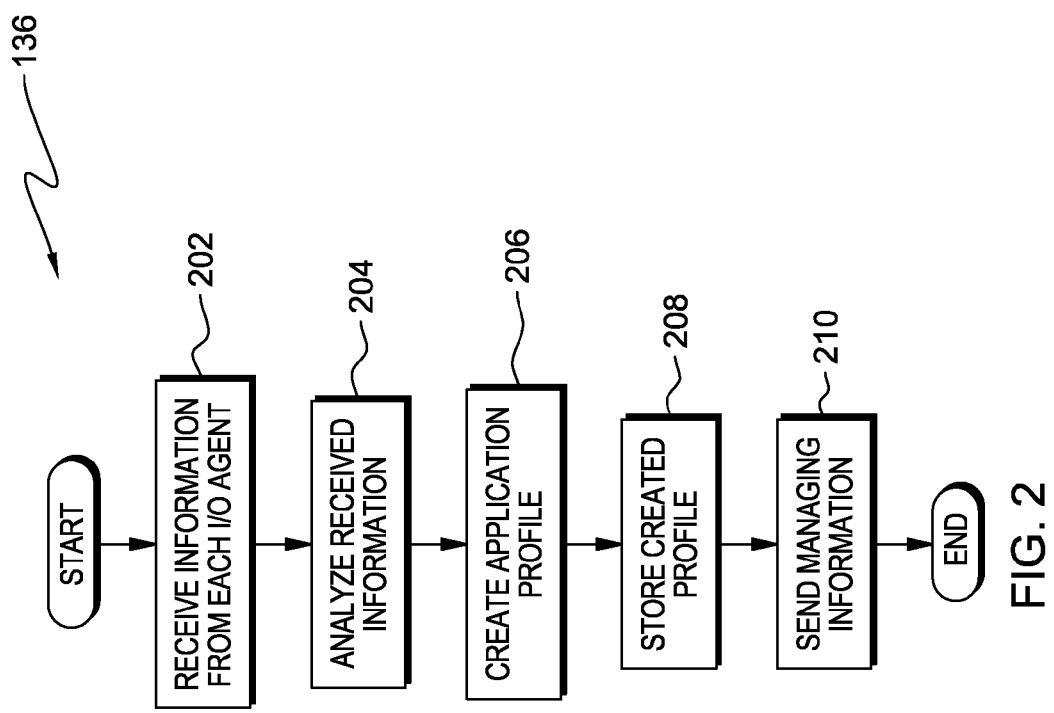
FIG. 2 depicts operational steps of the analytics engine of FIG. 1 for analyzing collected information in order to manage and balance I/O operations in the shared file system environment, in accordance with an embodiment of the present invention.

FIG. 2 depicts operational steps of analytics engine 136 for analyzing collected information in order to manage and balance I/O operations in shared file system environment 100, in accordance with an embodiment of the present invention.

Analytics engine 136 receives information from each I/O agent, via I/O masters 132A to 132N and I/O collector 134 (step 202). Information within shared file system environment 100 is collected by I/O agents 132A to 132N at each compute node 102 and transmitted to I/O masters 132A to 132N and centralized by I/O collector 134. Analytics engine 136 receives the collected and centralized information, which includes, for example, application names, types of applications running on compute nodes, number of compute nodes, I/O frequency, I/O patterns, and other I/O real time operations information.

Analytics engine 136 analyzes the received information (step 204) and creates application profile(s) (step 206). Analytics engine 136 creates an I/O profile for each application to obtain information such as whether an application is I/O intensive, what type of I/O operations are required, and what resources the application needs within shared file system environment 100.

Analytics engine 136 stores the created profile(s) (step 208). The created profiles can be stored in I/O database 140 for access by analytics engine 136.

Analytics engine 136 sends managing information to job scheduler 138 or compute nodes 102 (step 210). Analytics engine 136 uses the created profiles to determine what actions should be taken by either job scheduler 138 or by I/O agents 104A to 104N at the compute node level. Analytics engine 136 can send orders to job scheduler 138 to manage job queues and the jobs currently running. Analytics engine 136 can also send orders to I/O agents 104A to 104N, through I/O masters 132A to 132N and I/O collector 134, to manage applications and operating system parameters, for example, at the compute node level.

Figure 3:
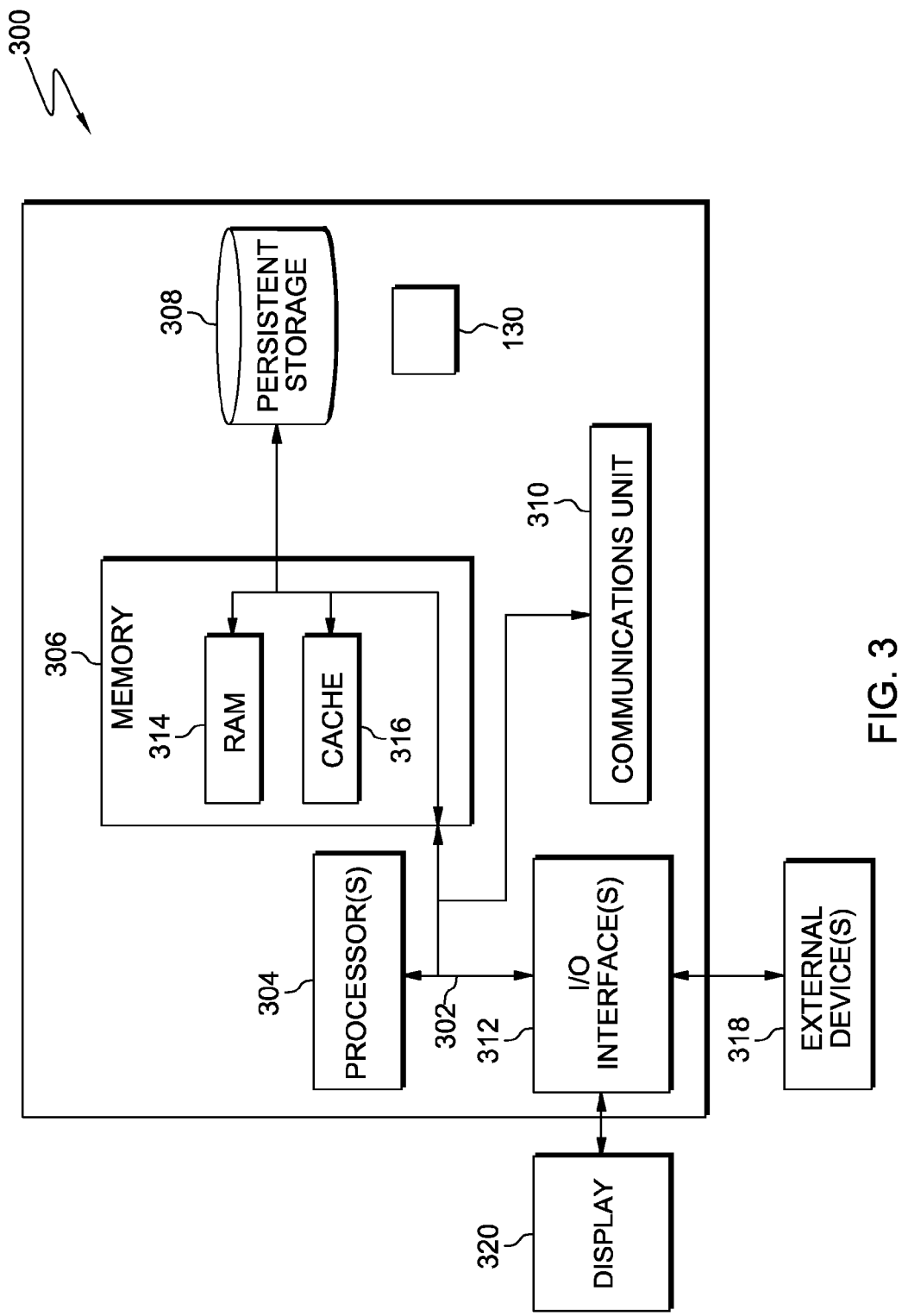
FIG. 3 depicts a block diagram of components of a computer system 300, such as a computer system operating within the shared file system environment 100 and on which the I/O subsystem manager may run, in accordance with an embodiment of the present invention.

FIG. 3 depicts a block diagram of components of a computer system 300, such as a computer system operating within shared file system environment 100 and on which I/O subsystem manager 130 may run, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer system 300 can include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

In various embodiments of the present invention, I/O subsystem manager 130 and each of I/O masters 132A to 132N, I/O collector 134, analytics engine 136, job scheduler 138 and I/O database 140 can be stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including computers 102A to 102N and shared file system 110. In these examples, communications unit 310 includes one or more network interface cards. Communications unit 310 may provide communications through the use of either or both physical and wireless communications links. I/O subsystem manager 130 and each of I/O masters 132A to 132N, I/O collector 134, analytics engine 136, job scheduler 138 and I/O database 140 may be downloaded to persistent storage 308 through communications unit 310.

I/O interface(s) 312 allows for input and output of data with other devices that may be connected to computer system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., I/O masters 132A to 132N, I/O collector 134, analytics engine 136, job scheduler 138 and I/O database 140, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing I/O operations in a shared file system environment, the method comprising:

receiving, by a plurality of I/O masters executed by one or more computer processors, from an I/O agent running on each of a plurality of compute nodes organized into a plurality of subsets, information associated with I/O accesses to a shared file system and applications for executing the I/O accesses, wherein each I/O master is responsible for and receives the information from a corresponding subset of the plurality of compute nodes;

transferring the received information from the plurality of I/O masters to an I/O collector executed by the one or more computer processors;

transferring the received information from the I/O collector to an analytics engine executed by the one or more computer processors;

creating, by the analytics engine, application profiles, based, at least in part, on the received information;

transferring the application profiles from the analytics engine to a job scheduler executed by the one or more computer processors;

determining, by the job scheduler, application execution priorities for the applications, based, at least in part, on the created application profiles;

determining, by the job scheduler, resource allocations for the application execution priorities based, at least in part, on the created application profiles;

communicating the application execution priorities and the resource allocations from the job scheduler to the I/O collector through the analytics engine;

communicating from the I/O collector to each I/O master the application execution priorities and the resource allocations for the subset of the plurality of compute nodes for which the I/O master is responsible; and communicating from each I/O master to the I/O agent running on each compute node of the subset for which the I/O master is responsible the application execution priorities and the resource allocations, wherein the application execution priorities and the resource allocations are used to manage the I/O operations in the shared file system environment.

2. The method of claim 1, wherein the received information includes: application names, types of applications running on each of the plurality of compute nodes, number of compute nodes, application execution types, I/O resource requirements, I/O access frequency, I/O access patterns, and I/O real time operations information.

3. The method of claim 1, further comprising the step of storing the received information for each of the plurality of compute nodes and the created application profiles in a database for the shared file system environment.

4. The method of claim 1, further comprising:

determining, by the job scheduler, a job schedule, based, at least in part, on the determined application execution priorities for the applications;

communicating the job schedule from the job scheduler to the I/O collector through the analytics engine;

communicating from the I/O collector to each I/O master a portion of the job schedule pertaining to the subset of compute nodes for which the I/O master is responsible; and communicating by each I/O master the portion of the job schedule received by the I/O master to the plurality of compute nodes of the subset for which the I/O master is responsible.

5. A computer program product for managing I/O operations in a shared file system environment, the computer program product comprising:

one or more non-transitory computer-readable storage media and program instructions stored on the one or more non-transitory computer-readable storage media, the program instructions when executed by a processor of an I/O subsystem manager causes the processor to perform a method comprising:

receiving, by a plurality of I/O masters of the I/O subsystem manager, from an I/O agent running on each of a plurality of compute nodes organized into a plurality of subsets, information associated with I/O accesses to a shared file system and applications for executing the I/O accesses, wherein each I/O master is responsible for and receives the information from a corresponding subset of the plurality of compute nodes;
transferring the received information from the plurality of I/O masters to an I/O collector of the I/O subsystem manager;
transferring the received information from the I/O collector to an analytics engine of the I/O subsystem manager;
creating, by the analytics engine, application profiles, based, at least in part, on the received information;
transferring the application profiles from the analytics engine to a job scheduler of the subsystem manager;
determining, by the job scheduler, application execution priorities for the applications, based, at least in part, on the created application profiles;
determining, by the job scheduler, resource allocations for the application execution priorities based, at least in part, on the created application profiles;
communicating the application execution priorities and the resource allocations from the job scheduler to the I/O collector through the analytics engine;
communicating from the I/O collector to each I/O master the application execution priorities and the resource allocations for the subset of the plurality of compute nodes for which the I/O master is responsible; and
communicating from each I/O master to the I/O agent running on each compute node of the subset for which the I/O master is responsible the application execution priorities and the resource allocations, wherein the application execution priorities and the resource allocations are used to manage the I/O operations in the shared file system environment.

6. The computer program product of claim 5, wherein the received information includes: application names, types of applications running on each of the plurality of compute nodes, number of compute nodes, application execution types, I/O resource requirements, I/O access frequency, I/O patterns, and I/O real time operations information.

7. The computer program product of claim 5, wherein the method further comprises storing the received information for each of the plurality of compute nodes and the created application profiles in a database for the shared file system environment.

8. The computer program product of claim 5, wherein the method further comprises:
determining, by the job scheduler, a job schedule, based, at least in part, on the determined application execution priorities for the applications;
communicating the job schedule from the job scheduler to the I/O collector through the analytics engine;
communicating from the I/O collector to each I/O master a portion of the job schedule pertaining to the subset of compute nodes for which the I/O master is responsible; and
communicating, by each I/O master the portion of the job schedule received by the I/O master to the compute nodes of the subset for which the I/O master is responsible.

9. A computer system for managing I/O operations in a shared file system environment, the computer system comprising:
one or more computer processors;
one or more non-transitory computer-readable storage media;
program instructions, stored on the one or more non-transitory computer-readable storage media, that are executed by the one or more computer processors to realize a plurality of I/O masters, an I/O collector, an analytics engine, and a job scheduler so that:
the plurality of I/O masters receives from an I/O agent running on each of a plurality of compute nodes organized into a plurality of subsets, information associated with I/O accesses to a shared file system and applications for executing the I/O accesses, wherein each I/O master is responsible for and receives the information from a corresponding subset of the plurality of compute nodes;
the plurality of I/O masters transfers the received information to the I/O collector;
the I/O collector transfers the received information to the analytics engine;
the analytics engine creates application profiles, based, at least in part, on the received information;
the analytics engine transfers the application profiles to the job scheduler;
the job scheduler determines application execution priorities for the applications, based, at least in part, on the created application profiles;
the job scheduler determines resource allocations for the application execution priorities based, at least in part, on the created application profiles;
the job scheduler communicates the application execution priorities and the resource allocations to the I/O collector through the analytics engine;
the I/O collector communicates to each I/O master the application execution priorities and the resource allocations for the subset of the plurality of compute nodes for which the I/O master is responsible; and
each I/O master communicates to the I/O agent running on each compute node of the subset for which the I/O master is responsible the application execution priorities and the resource allocations, wherein the application execution priorities and the resource allocations are used to manage the I/O operations in the shared file system environment.

10. The computer system of claim 9, wherein the received information includes: application names, types of applications running on each of the plurality of compute nodes, number of compute nodes, application execution types, I/O resource requirements, I/O access frequency, I/O patterns, and I/O real time operations information.

11. The computer system of claim 9, further comprising a database within which the received information for each of the plurality of compute nodes and the created application profiles are stored.

12. The computer system of claim 9, wherein:
the job scheduler determines a job schedule, based, at least in part, on the determined application execution priorities for the applications;
the job scheduler communicates the job schedule to the I/O collector through the analytics engine;
the I/O collector communicates to each I/O master a portion of the job schedule pertaining to the subset of compute nodes for which the I/O master is responsible; and
each I/O master communicates the portion of the job schedule received by the I/O master to the compute nodes of the subset for which the I/O master is responsible.

* * * * *